No. 730,251. PATENTED JUNE 9, 1903.
G. GIBBS.
ELECTRIC MOTOR CAR AND SYSTEM OF MOUNTING AND WIRING
ELECTRICAL APPARATUS THEREON.
APPLICATION FILED DEC. 1, 1902.
NO MODEL. 2 SHEETS—SHEET 1.
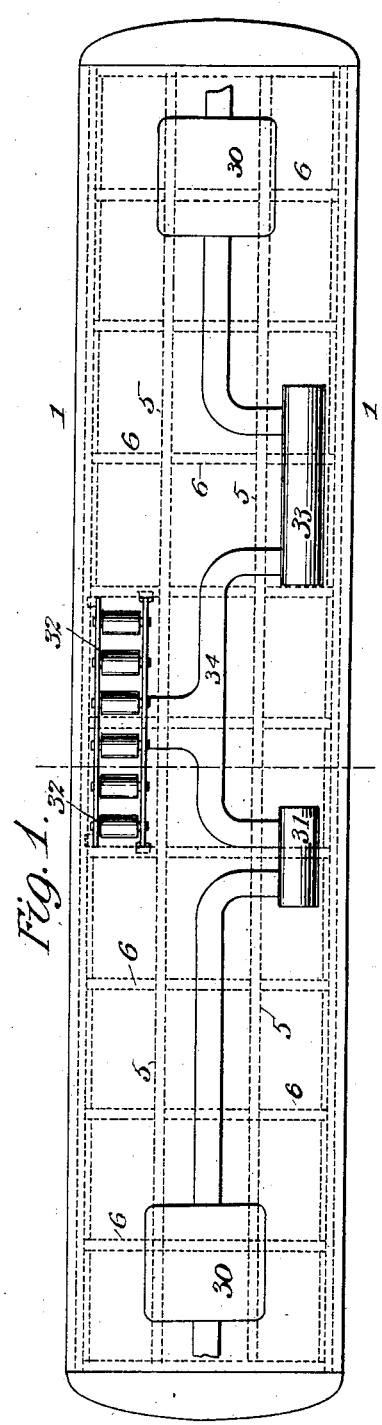
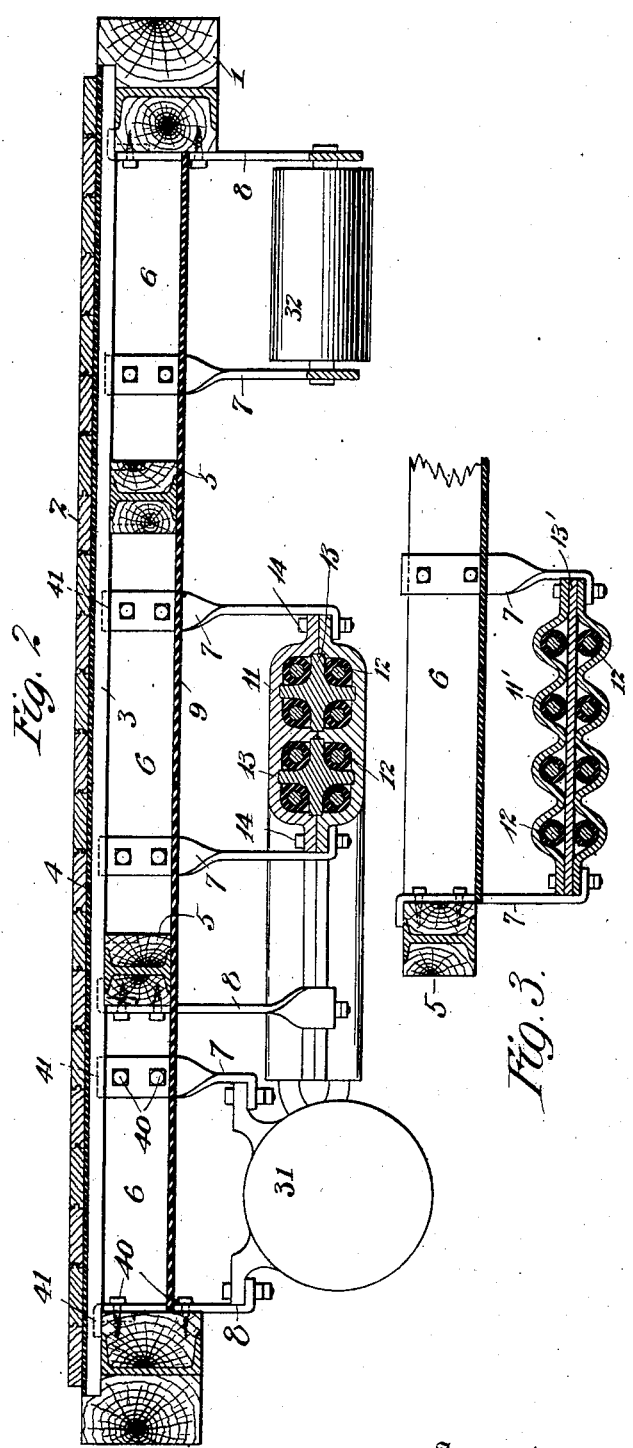
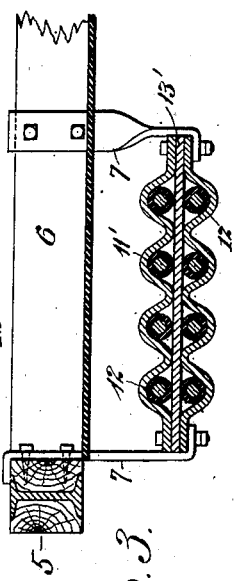

No. 730,251. PATENTED JUNE 9, 1903.
G. GIBBS.
ELECTRIC MOTOR CAR AND SYSTEM OF MOUNTING AND WIRING
ELECTRICAL APPARATUS THEREON.
APPLICATION FILED DEC. 1, 1902.
NO MODEL. 2 SHEETS—SHEET 2.
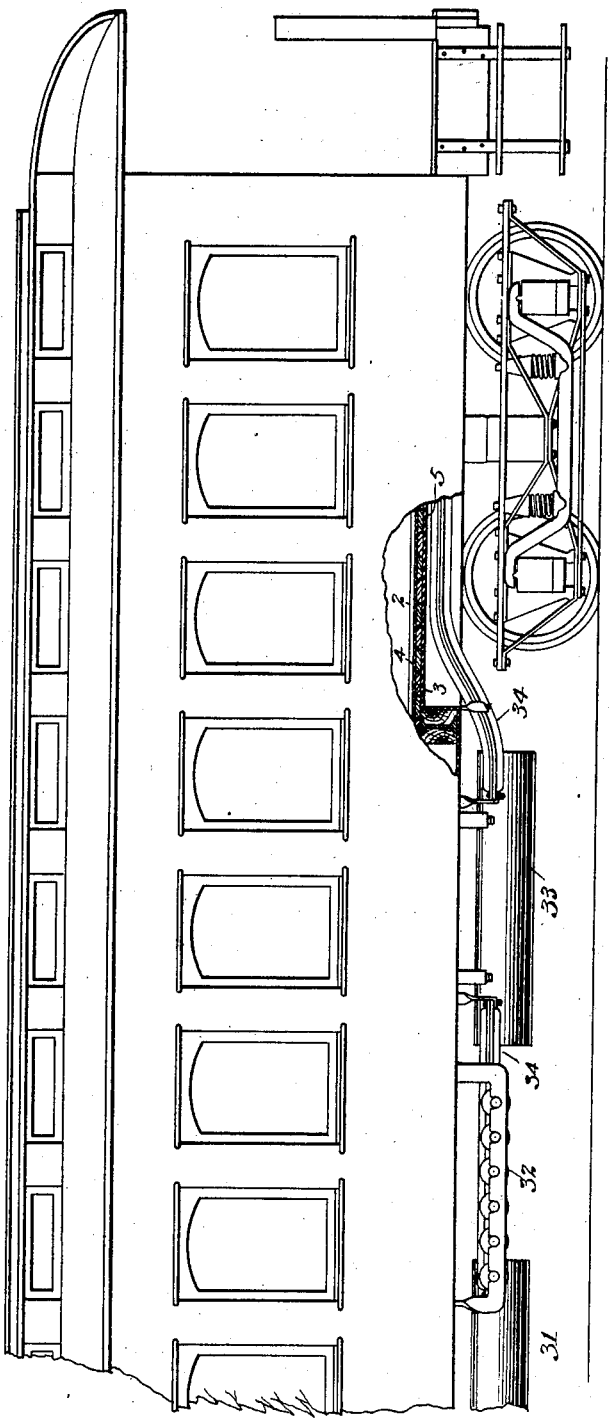
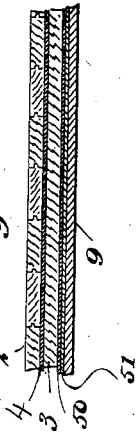

No. 730,251. Patented June 9, 1903.

UNITED STATES PATENT OFFICE.

GEORGE GIBBS, OF NEW YORK, N. Y.

ELECTRIC-MOTOR CAR AND SYSTEM OF MOUNTING AND WIRING ELECTRICAL APPARATUS THEREON.

SPECIFICATION forming part of Letters Patent No. 730,251, dated June 9, 1903.

Application filed December 1, 1902. Serial No. 133,313. (No model.)

*To all whom it may concern:*

Be it known that I, GEORGE GIBBS, a citizen of the United States, and a resident of New York, in the county of New York and State of New York, have invented certain new and useful Improvements in Electric-Motor Cars and Systems of Mounting and Wiring Electrical Apparatus Thereon, of which the following is a specification.
The present invention relates to an improved system of installing electrical apparatus on electric-motor cars, and it concerns itself not only with the proper mounting of the apparatus mentioned, but also with the wiring of the car and the apparatus, the whole being designed to properly protect the car itself and the electrical apparatus from fire or other dangers due to the formation of electric arcs under conditions as they now exist.
Insufficient attention has hitherto been paid to the proper wiring of motor-cars and the proper installation of the electrical apparatus generally from the standpoint of fire protection. It has been thought sufficient to provide electrical connections without adequate regard to the special dangers to which apparatus and cars of the kind in question are subject. Consequently the apparatus has been mounted indifferently either outside or inside the cars, and the wires have been run in whatever way seemed most convenient, the problems involved being treated mainly as problems relating to the proper support of the wires and the electrical apparatus and of the proper electrical continuity and integrity of the system and of compactness and convenience rather than as problems involving the necessity for adequate protection of the apparatus and the car from the effects of accidental arcs or short-circuiting. The practice thus described is dangerous on any motor-car, but it becomes particularly dangerous when the motors and the amount of current required to operate them are large, requiring correspondingly large wires, circuit-breakers, fuses, &c., in order to conduct the needful amount of current. Accidental short circuits as between wires or adjoining metal work, the breakage of wires, loose connections or defects in the controlling apparatus, and similar causes have not infrequently resulted in the formation of arcs of large carrying capacity and of considerable duration, as a consequence of which the electrical wiring or apparatus has been injured or destroyed, and in some instances the car itself has been set on fire. Dangers of this character are liable to arise even with the most careful attention to the installation of the wiring and apparatus, and for this reason one feature of my invention is concerned with the proper construction of the car itself.

The remaining novel features of my invention reside in properly locating the apparatus and the wires and properly installing, insulating, and protecting them, with the ultimate view of protecting the cars as well.

As to the location of the apparatus, including the wires, the circuit-breakers, the fuses, and the like, I prefer to place them underneath the car-body; and as to the installation, insulation, and protection of the wires and apparatus, I cover them as far as possible with a sheathing or envelop of some good insulating and fire-protecting material, such as transite, electrobeston, uralite, or other asbestos compound, and separate them, with their covering, by an air-space from all the inflammable or metal parts of the car, not only for the purpose of minimizing the danger of the arc coming into contact with the wooden or metal portions of the car, but also in order to permit the arc to be dissipated without the concentration of its heat upon any one spot, which is a danger that always exists when the wiring is run close to the inflammable or metal parts of the car or is confined, say, within an insulating-tube which itself rests against or close to such inflammable or metal portions. In other words, I do not rely solely upon the use of a sheathing of fire-resisting material to protect the car from the effects of an arc when a wire is broken, knowing that a powerful electric arc concentrated upon a small portion of such a sheathing will eventually dissipate the fire-resisting material of the sheathing and endanger the neighboring parts of the car, but I provide for the dissipation of the arc and the further protection of the car by surrounding the sheathing of fire-resisting material with a considerable air-space. Moreover, I place underneath the car-bottom, between it and the wiring, a sheet of good fire-resisting material—such, for example, as that described above—this sheet being permanently attached to the car-bottom and being secured, as far as possible, as an unbroken sheet under the entire surface of the car. This sheet may be secured in any suitable manner, as by nails or screws, to the car-sills, bridging, &c. I may construct the car with a double floor having its two parts separated by a fire-resisting sheet, or I may place such a sheet directly under the floor of a car provided with a single flooring. In either case or whatever the character of the floor may be I purpose providing an air-space below the floor and also providing an inclosing sheet or lining of fire-resisting material below the car, as indicated above. Thus I may apply the inclosing sheet or lining to a car of metal, such as steel, the purpose then being to prevent any arcing against the metallic portions of the car.

My invention will be understood by reference to the accompanying drawings, in which—

Figure 1 is a bottom view of an electric-motor car and the electrical apparatus supported below the same. Fig. 2 is a transverse section of the car, taken along the lines 2 2 in Fig. 1, looking in the direction of the arrow. Fig. 3 is a detail view illustrating a modification of the devices for protecting the wiring. Fig. 4 is a side elevation and part section of a portion of an electric-motor car, and Fig. 5 is a detail view.

Referring to the drawings, 1 1 represent the side sills of a car-body.

2 and 3 represent the upper and lower portions, respectively, of the flooring of the car, and 4 represents a sheet of fire-resisting material—such as transite, asbestos, fire-felt, or the like—interposed between the parts 2 and 3 of the flooring. If a single floor is used, the sheet 4 may be underneath the floor and directly on top of the sills.

Intermediate car-sills are shown at 5 5, and at 6 appears a suitable bridging extending from sill to sill, this bridging extending across the car and being interrupted by the sills to which it is attached. To this bridging, as shown in Fig. 2, are attached brackets or hangers 7 7 at intermediate portions of the bridging, other brackets, 8 8, being secured to the sills 1 1 and to one or more of the intermediate sills 5 5, the means of attachment being in each case bolts, lipping, or both, or other suitable fastening devices. Such bolts are shown at 40 40, while lipping devices are illustrated at 41 41.

To the bottom of the bridging-pieces and underneath the intermediate sills I secure a sheet 9 of transite or other good fire-resisting material, forming, so far as possible, a complete and unbroken protecting sheathing underneath the entire car-body. Wherever the car-wheels or other portions of the car structure or apparatus project upward under the car too far to permit the sheet 9 to extend in a straight horizontal line under the car-body the sheet may be bent upward and secured to the lower part of the flooring, either directly or with interposed sheets of steel or fire-felt, or both. This construction is illustrated in Fig. 5, where I show the upper portion 2 of the flooring separated from the lower portion 3 by a sheet 4 of fire-resisting material, while underneath the lower portion are sheets 50 51, the former being a sheet of fire-felt or similar material and the latter a sheet of steel. The sheet 9 already described is arranged below the steel sheet 51, as shown. This arrangement may be varied; but in any case it is desirable, and usually necessary, to bend upward the sheet 9 over the truck portion of the car.

The brackets 7 and 8 are adapted to support the electrical apparatus carried by the car exclusive of the motors 30 30, which are supported on the trucks. The remaining electrical apparatus, however, including the controller 31, the resistances 32, and the circuit-breaker 33, together with the wiring 34, are supported from the bottom of the car through the sills or the bridging-pieces by the brackets 7 and 8.

Referring more particularly to the wiring, as illustrated in Fig. 2, two of the brackets or hangers 7 7 here support a suitable sheathing 11, made of transite or other good fire-resisting material and surrounding any required number of wires 12 12, leading to the electrical apparatus. In the instance illustrated the number of wires is eight, and the sheathing 11 is made in two corresponding halves or parts which when properly placed together leave openings for the reception of +-shaped pieces 13 13, preferably of the same material as the sheathing. The wires 12 lie between the +-shaped pieces and the sheathing, as shown, and are thus protected from breakage by strong supports, and are also thoroughly insulated and separated from the inflammable and metallic portions of the car frame or body. The sheathing 11 is attached to the supporting-brackets by bolts 14 14 or by any other suitable means. The wires 12 may be laid in bare or they may be wires which are already provided with the usual insulation.

In Fig. 3 I show somewhat-different means for protecting and insulating the wires 12. Here the sheathing 11' is formed into corrugated sheets with an intermediate straight sheet of insulation. The wires are held in pairs on opposite sides of the straight sheet and between the same and the rising or retreating portions of the corrugated sheets.

Other forms and configurations of the sheathing and the cores may be adopted without departing from the spirit of the present invention.

It will be observed that the described mounting of the electric wires is such as to leave a free air-space around the wires and the sheathing. It will also be seen that the described structure furnishes a strong support for the wires and to a great extent removes the danger of the wires being ruptured under ordinary conditions.

In general the controller, the resistances, the circuit-breaker, and the wiring are mounted free from the car-body, by which I mean that there is an air-space between the apparatus and the wiring on the one hand and the inflammable and metal portions of the car on the other. Naturally the advantages of this arrangement would exist, only in a lessened degree, if one or more of the elements named were mounted close to the car-flooring or on the car-body, provided some of them are mounted free, as described. For example, if the controller were mounted in its usual position on the car-platform or at the end of the car, while the wiring and the rest of the apparatus were mounted as herein described or in some equivalent way, the spirit of my invention would still reside in an arrangement of that kind.

I prefer to mount the controller 31 on brackets 7 and 8, as clearly shown in Fig. 2, a similar mounting being provided for the resistances 32. Moreover, a similar style of mounting may be assumed for the circuit-breaker 33, and it is therefore not thought necessary to illustrate specifically the mounting of the circuit-breaker.

As has already been explained, the motors may be mounted on the car-trucks in any preferred way.

When the controller is located underneath the car, means will be provided on the car-platform for operating it either through a master-controller or some mechanical system of transmission. This will be understood without special illustration, as it is comprised in well-known systems of multiple-unit operation.

I claim as my invention—

1. A system of wiring for electric-motor cars, in which the wires are incased in fire-resisting envelops mounted underneath the car and free from all inflammable and metal portions of the car.

2. An electric-motor car, having the electric wires below the floor of the car, and having the floor made in two parts in different horizontal planes, with a sheet of fire-resisting material interposed between the parts.

3. An electric-motor car, having the electric wires mounted below the floor thereof, and supporting a sheet of insulating material between the wires and the floor-bottom, the relations between the insulating-sheet and the wires and their covering being such that there is a free air-space between them.

4. An electric-motor car, having hangers or brackets depending below the same, a fire-resisting and protecting sheathing supported by the said hangers or brackets, in combination with electric wires running through the said sheathing, and supported thereby.

5. An electric-motor car, having hangers or brackets depending below the same, a fire-resisting and protecting sheathing supported by the said hangers or brackets, in combination with electric wires running through the said sheathing, and supported thereby, the location of the wires and the sheathing being such as to leave a free air-space around the same.

6. An electric-motor car, having the electric motors mounted on the car-trucks, and the resistance, mounted free under the car-floor, the wiring connecting the motors and the resistances being also mounted free from the inflammable and metal portions of the car.

7. An electric-motor car, having the electric motors mounted on the car-trucks, a circuit-breaker and resistances, both mounted free under the car floor or bottom, and electric wires connecting the electrical apparatus named, the said wiring being itself mounted free from the inflammable and metal portions of the car.

8. An electric-motor car, having the electric motors mounted on the car-trucks, a controller for the said motors, a circuit-breaker and resistances, the said controller, circuit-breaker and resistances being mounted free under the car floor or bottom, and the electric wires connecting the electrical apparatus being also mounted free from the inflammable and metal portions of the car.

9. An electric-motor car, having the usual electrical apparatus and the wiring therefor, supported below the car floor or bottom, both the wiring and the apparatus being mounted free from the inflammable and metal portions of the car.

Signed at New York, in the county of New York, and State of New York, this 29th day of November, A. D. 1902.

GEORGE GIBBS.

Witnesses:
WM. H. CAPEL,
GEORGE H. STOCKBRIDGE.